(12) United States Patent
Casal et al.

(10) Patent No.: US 12,432,299 B2
(45) Date of Patent: Sep. 30, 2025

(54) CARRIER SIGNALING BASED AUTHENTICATION AND FRAUD DETECTION

(71) Applicant: Pindrop Security, Inc., Atlanta, GA (US)

(72) Inventors: Ricky Casal, Atlanta, GA (US); Vinay Maddali, Atlanta, GA (US); Payas Gupta, Atlanta, GA (US); Kailash Patil, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 160 days.

(21) Appl. No.: 18/221,802

(22) Filed: Jul. 13, 2023

(65) Prior Publication Data

US 2024/0022662 A1    Jan. 18, 2024

Related U.S. Application Data

(60) Provisional application No. 63/389,283, filed on Jul. 14, 2022.

(51) Int. Cl.
*H04M 3/42* (2006.01)
*H04M 3/51* (2006.01)

(52) U.S. Cl.
CPC ......... *H04M 3/42357* (2013.01); *H04M 3/51* (2013.01); *H04M 2203/6027* (2013.01)

(58) Field of Classification Search
None
See application file for complete search history.

(56) References Cited

U.S. PATENT DOCUMENTS

| | | | |
|---|---|---|---|
| 10,721,350 B1 * | 7/2020 | Maiorana | G10L 15/22 |
| 2024/0013223 A1 * | 1/2024 | Butvinik | G06Q 40/06 |

* cited by examiner

*Primary Examiner* — Quynh H Nguyen
(74) *Attorney, Agent, or Firm* — Foley & Lardner LLP

(57) ABSTRACT

Disclosed are systems and methods including computing-processes, which may include layers of machine-learning architectures, for assessing risk for calls directed to call center systems using carrier signaling metadata. A computer evaluates carrier signaling metadata to perform various new risk-scoring techniques to determine riskiness of calls and authenticate calls. When determining a risk score for an incoming call is received at a call center system, the computer may obtain certain metadata values from inbound metadata, prior call metadata, or from third-party telecommunications services and executes processes for determining the risk score for the call. The risk score operations include several scoring components, including appliance print scoring, carrier detection scoring, ANI location detection scoring, location similarity scoring, and JIP-ANI location similarity scoring, among others.

20 Claims, 7 Drawing Sheets

CARRIER SIGNALING BASED AUTHENTICATION AND FRAUD DETECTION

CROSS-REFERENCE TO RELATED APPLICATIONS

This application claims priority to U.S. Provisional Application No. 63/389,283, filed Jul. 14, 2022, which is incorporated by reference in its entirety.

TECHNICAL FIELD

This application generally relates to systems and methods for managing, training, and deploying a machine learning architecture for processing signaling data for call device or caller risk assessment and call authentication.

BACKGROUND

Fraudsters often target multiple unrelated targets in similar ways. In telecommunications and related technologies (such as voice-over-IP (VoIP)) a fraudster may attack targets by spoofing caller identification (e.g., a caller number and/or name). The convergence of IP (Internet protocol) and telephony, makes it easier for fraudsters to spoof caller identification without being detected by the callee. Normally, a genuine callee can be identified by an automatic number identification (ANI) or phone number, but the fraudster may claim to be a user by spoofing the user's ANI.

In internet networking, a fraudster may attack targets by manipulating a user's IP address. Normally, a genuine IP address (e.g., not fraudulent IP addresses) is used to identify network hardware connected to a network, but the fraudster may manipulate the user's IP address by creating virtual private networks (VPNs) to simulate the user's hardware being connected to a network.

Fraudulent attacks are often based on a history of attacks in which the fraudster collects information, commits fraud, or attempts to commit fraud. As the sophistication of threats that target sensitive data and critical systems grows, the importance of robust security mechanisms becomes even more important. Fraud detection is key to ensure that a request that claims to come from a certain source indeed does come from that source. As such, there remains a desire to improve the accuracy of fraud detection by leveraging the repetitive nature of fraudulent attacks.

SUMMARY

Disclosed herein are systems and methods capable of addressing the above-described shortcomings and may also provide any number of additional or alternative benefits and advantages. Embodiments include a computing device that executes software routines for one or more machine-learning architectures. The embodiments described herein include the machine-learning architecture executed by computing devices for evaluating carrier signaling metadata to perform various new risk scoring techniques to determine riskiness of calls and authenticate calls directed to a call center system or enterprise.

In some embodiments, a computer-implemented method comprises obtaining, by a computer, call metadata of a plurality of calls from directed to a call center system, the call metadata of each call indicates a caller ANI and a telephony appliance; generating, by the computer, one or more appliance clusters for one or more telephony appliances, each appliance cluster representing an amount of the calls including the telephony appliance and the caller ANI in the call metadata; generating, by the computer, a first risk score for an inbound call indicating a similarity of the telephony appliance in the metadata of the inbound call compared against one or more telephony appliances represented by the one or more appliance clusters; generating, by the computer, a predicted carrier score by applying a classifier comprising machine-learning models on the inbound metadata of the inbound call, each machine-learning model is trained to output a carrier detection score for a particular carrier; generating, by the computer, a second risk score for the inbound call based upon comparing the predicted carrier score against an expected carrier score obtained from a database; and generating, by the computer, a combined risk score for the inbound call by algorithmically combining each risk score.

In some embodiments, a system comprises a non-transitory storage configured to store a machine-learning architecture having a classifier layer comprising a plurality of machine-learning models executable by machine-executed software programming; and a computer comprising a processor in communication with the non-transitory storage and configured to: obtain call metadata of a plurality of calls from directed to a call center system, the call metadata of each call indicates a caller ANI and a telephony appliance; generate one or more appliance clusters for one or more telephony appliances, each appliance cluster representing an amount of the calls including the telephony appliance and the caller ANI in the call metadata; generate a first risk score for an inbound call indicating a similarity of the telephony appliance in the metadata of the inbound call compared against one or more telephony appliances represented by the one or more appliance clusters; generate a predicted carrier score by applying the classifier comprising the machine-learning models on the inbound metadata of the inbound call, each machine-learning model is trained to output a carrier detection score for a particular carrier; generate a second risk score for the inbound call based upon comparing the predicted carrier score against an expected carrier score obtained from a database; and generate a combined risk score for the inbound call by algorithmically combining each risk score.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
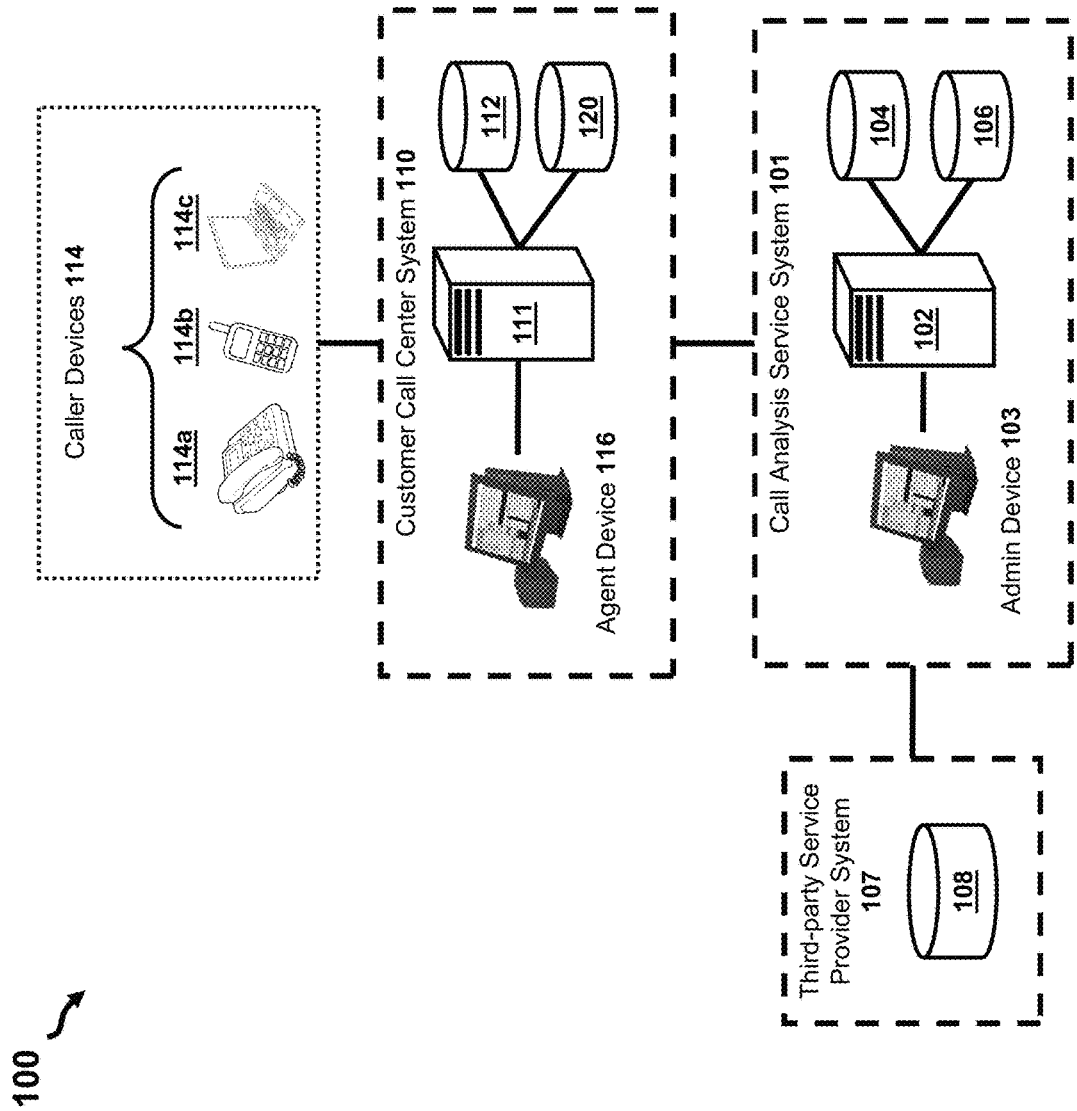
FIG. 1 shows components of a system for processing audio signals according to various language compensation functions of a machine-learning architecture.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 shows components of a system 100 for receiving and analyzing telephone calls, according to an illustrative embodiment. The illustrative system 100 comprises analytics servers 102, call records databases 104, analytics databases 106, telephony databases 108, customer call center systems 110 of customer enterprises (e.g., companies, government entities), and caller devices 114.

Embodiments may comprise additional or alternative components or omit certain components from what is shown in FIG. 1, yet still fall within the scope of this disclosure. For ease of description, FIG. 1 shows only one instance of various aspects the illustrative embodiment. However, other embodiments may comprise any number of the components. For instance, it will be common for there to be multiple call center systems 110, or for an analytics system 101 to have multiple analytics servers 102. Although FIG. 1 shows the illustrative system 100 having only a few of the various components, embodiments may include or otherwise implement any number of devices capable of performing the various features and tasks described herein. For example, in the illustrative system 100, an analytics server 102 is shown as a distinct computing device from an analytics database 106; but in some embodiments the analytics database 106 may be integrated into the analytics server 102, such that these features are integrated within a single device.

The illustrative system 100 of FIG. 1 comprises various network infrastructures 101, 107, 110, including a call analytics system 101, a third-party telephony service provider system 107 and customer call centers 110. The network infrastructures 101, 107, 110 may be a physically and/or logically related collection of devices owned or managed by some enterprise organization, where the devices of each infrastructure 101, 107, 110 are configured to provide the intended services of the particular infrastructure 101, 107, 110 and responsible organization.

A call analytics system 101 is operated by a call analytics service that provides various call management, security, authentication, and analysis services to customer organizations (e.g., corporate call centers, government entities). Callers can place telephone calls to call centers 110 of various organizations. When caller devices 114 originate telephone calls, call data for the telephone calls are generated by components of telephony networks and carrier systems, such as switches and trunks, as well as caller devices 114. The call data can be forwarded to, or otherwise received by, the call analytics system 101. Components of the analytics service 101, such as an analytics server 102, execute various processes based upon the call data in order to provide call analytics services to organizations that are customers of the call analytics service.

A third-party telephony service system 107 is operated by a third-party organization offering telephony services to organizations such as the call analytics system 101. In the illustrative system 100, the third-party telephony service is a separate company from the call analytics service, though it is not required; the third-party service may be a separate company or a sibling entity of a common parent entity. In some embodiments, there may not be a third-party, but rather the call analytics system 101 may comprise the hardware and software components of the third-party telephony service system 107 described herein. The third-party telephony services may provide high-level telecommunications or network governance and planning services, such as authoritative directory services, DNS services, ANI governance or registries, Caller ID governance or registries, and the like. As shown in FIG. 1, the third-party system 107 comprises a telephony database 108 that stores information about, for example, calling devices 114, ANIs, and Caller IDs, among other information about telecommunications systems and devices. The call analytics system 101 may query the telephony database 108 according to purported information received with or derived from metadata received from calling devices 114 during telephone calls, such as an ANI or Caller ID received with a current call. The information retrieved from the telephony database 108 may be, for example, various information known to be (by registration) or otherwise frequently associated with the Caller ID or ANI.

Customer call center systems 110 are owned and operated by organizations (e.g., corporations, government entities) that are customers of the call analytics service. Call center systems 110 may receive telephone calls from callers who are consumers or users of services offered by customer organizations. Call data received with phone calls may be captured by devices of call center systems 110 and forwarded to the call analytics system 101 via one or more networks. For instance, a customer may be a bank that operates a call center system 110 to handle calls from consumers regarding accounts and product offerings. As a customer of the call analytics service, the bank's call center system 110 forwards captured call data to the call analytics system 101, which may determine risk scores of calls on behalf of the bank.

The various components of the system 100 may be interconnected with each other through hardware and software components of one or more public or private networks. Non-limiting examples of such networks may include a Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, caller devices 114 may communicate with callee-destinations (e.g., customer call centers 110) via telephony and telecommunications protocols, hardware, and software capable of hosting, transporting, and exchanging telephony-based call data (e.g., media data, signaling data) associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as, for example, carriers, exchanges, and networks, among others.

In the illustrative system 100 of FIG. 1, a call analytics system 101 comprises an analytics server 102, an admin device 103, a call records database 104, and an analytics database 106. The call analytics server 102 may receive call data from the records database 104 and various data structures (e.g., probability tables, metadata weights, feature vectors, trained machine-learning models) used for executing anti-fraud or anti-spoofing processes. The analytics server 102 may also query or otherwise receive certain types of data from a telephony database 108, which may be operated by a third-party service and may contain data about, for example, caller devices 114, carriers, callers, and other types of information.

An analytics server 102 of the analytics system 101 may generate and store probability data in an analytics database 106 using call data (e.g., signaling data) of past and/or current inbound calls, as received from, for example, customer call center systems 110, third-party telephony service systems 107, and/or other telecommunications systems. The analytics server 102 may use this probability data to generate a risk score for a current inbound call 110, and in turn determine whether the risk score satisfies a threshold value, which may be a call verification value or a threat risk threshold.

The analytics server 102 may be any computing device comprising one or more processors and software, and capable of performing the various processes and tasks described herein. The analytics server 102 may be in network-communication with databases 104, 106, 108, and may receive call data from one or more customer call centers 110, and a third-party service system 107. Although FIG. 1 shows a single analytics server 102, it should be appreciated that, in some embodiments, the analytics server 102 may include any number of computing devices. In some cases, the computing devices of the analytics server 102 may perform all or sub-parts of the processes and benefits of the analytics server 102. It should also be appreciated that, in some embodiments, the analytics server 102 may comprise any number of computing devices operating in a cloud computing or virtual machine configuration. It should also be appreciated that, in some embodiments, functions of the analytics server 102 may be partly or entirely performed by computing devices of a customer call center 110 (e.g., customer server 111).

In operation, the analytics server 102 may execute various software-based processes that, for example, ingest call data of telephone calls, query one or more databases 104, 106, 108, generate probability data based on prior call data of prior calls, and determine a risk score of a current inbound call to a call center 110 using the probability data. For each current inbound call, the analytics server 102 may execute caller verification or fraud detection processes using signaling data (e.g., carrier metadata, derived metadata) of the current call and the probability data (e.g., probability lookup tables, machine-learning models, feature vectors) stored in the analytics database 106. The call analytics server 102 generates a risk score for the current inbound call and determines whether the risk scores satisfy a threshold value, which may be a threat risk threshold or a call verification threshold. A call records database 104 and/or analytics database 106 may store current and prior call data and/or labels that the analytics server 102 may use to generate the probability data, which the analytics server 102 uses to generate the risk score. For threat risk assessment implementations, the probability data indicates to the analytics server 102 the probability that the values of various signaling data fields have occurred or should occur for inbound calls. For call verification implementations, the probability data may indicate to the analytics server 102 the probability that the values of various signaling data fields of the current inbound call match, within the verification threshold, prior or expected calls of registered or otherwise known callers or calling devices 114. Registered call data and/or the probability data associated with registered callers or calling devices 114 may be stored in an analytics database 106 and/or third-party telephony database 108. The analytics server 102 may reference the registered call data to determine the likelihood that an inbound call originated from a registered calling device 114 or caller.

For ease of description, the embodiments described herein refer to generating a risk score and determining the likelihood that an inbound call is fraudulent or not fraudulent. But it should be appreciated that embodiments are not limited as such. For example, the risk score may also be a verification score or authentication score that is compared to a verification threshold, rather than a fraud risk threshold. As another example, labels may indicate whether values of certain signaling data fields of prior or current calls, were or are associated with fraudulent or non-fraudulent calls, but labels may additionally or alternatively indicate whether values of signaling data fields of prior or current calls, were or are associated with verified calling devices 114.

As mentioned, call data may include media data and signaling data. Signaling data may be in the form of, for example, carrier metadata or derived metadata. "Carrier metadata" includes data received with a phone call, such as the data generated by and according to the hardware and protocols of telecommunications carrier systems and networks. Non-limiting examples of carrier metadata fields received with a telephone call may include an originating switch, originating trunk, Jurisdiction Information Parameter (JIP), Originating Line Information (OLI), a P-Asserted-Identity value, and Caller ID, among others.

"Derived metadata" may be data fields having values that are derived, calculated, inferred, or otherwise determined by the analytics server 102 or other device using values of the carrier metadata. Non-limiting examples of derived metadata may include: a carrier, a geographic location, and line type (e.g., cellular, landline, VoIP). For example, the analytics server 102 may use a Caller ID or other types of carrier metadata of a telephone call to determine the carrier or geographic location originating the telephone call. As mentioned, probability data generated by the analytics server 102 may be based upon and otherwise indicate correlations to carrier metadata values to derived metadata values by analyzing a large number of telephone calls. Purported information and purported metadata may refer to the Caller ID and metadata fields derived from Caller ID, as discussed below. Caller ID received with an inbound call and the derived metadata may be considered "purported" because a Caller ID can be spoofed and also because the resulting data or values of derived metadata (derived using the Caller ID) could be spoofed or inaccurate. By contrast, the data or values of other carrier metadata fields cannot be spoofed.

The analytics server 102 may generate derived metadata fields using certain carrier metadata fields or metadata otherwise received with a telephone call. For example, in some implementations, the analytics server 102 may query a telephony database 108 using the value of the Caller ID to retrieve certain derived metadata fields (e.g., line type, carrier, location). In some implementations, derived Caller ID metadata may be stored or cached into a call records database 104 or analytics database 106 for quicker access by the analytics server 102.

In some embodiments, the analytics server 102 may use derived metadata, as generated by the analytics server 102 or retrieved from a telephony database 108, to generate probability lookup tables containing various types of probability data, based upon correlations with carrier metadata in the call records database 104 for prior calls or for a current inbound call. The derived metadata may be generated or otherwise referenced to determine the likelihood that a current telephone call is fraudulent or spoofed. Additionally or alternatively, in some embodiments the probability data generated by the analytics server 102 may include trained machine-learning models and/or feature vectors for particular Caller IDs, ANIs, or other identifiers associated with potential calling devices 114. In such cases, the analytics server 102 may generate probability values (e.g., probability scores described above in probability lookup tables) as features fed into a machine learning model.

The analytics server 102 may generate or update the stored lookup tables, feature vectors, or trained machine-learning models at, for example, a certain time interval, in response to a one or more triggering events, in real-time as data or calls are received, or any combination of these options. As an example, the analytics server 102 may automatically generate or update the lookup tables, feature vectors, or trained machine-learning models at any interval, such as, for example, every day, week, month, or year. As another example, the analytics server 102 may automatically generate or update lookup tables, feature vectors, or trained machine-learning models in response to a triggering event, such as, for example, an instruction of a user (e.g., administrative user, agent of a call center system 110), or identifying a new fraudulent telephone call, among others. As another example, the analytics server 102 may automatically generate or update the lookup tables, feature vectors, or trained machine-learning models in real-time when a call is received or at some other time point during the lifecycle of a current call. In the illustrative system 100, the analytics server 102 may store new or updated lookup tables, feature vectors, or trained machine-learning models into an analytics database 106 or on any computing device.

In some cases, the analytics server 102 trains certain risk scoring or classification components of the machine-learning architecture using labeled data stored in the analytics database 106 or call records database 104 in order to train or otherwise generate machine-learning models. Labeled data may indicate, for example, expected locations for certain metadata.

In some implementations, the analytics server 102 may take certain actions based upon the calculated risk score. For example, if the risk score satisfies a certain risk threshold, the analytics server may determine that the current call is fraudulent. The analytics server 102 may, for example, generate a notification for display on a graphical user interface (GUI) of a computing device of an agent at a customer call center 110. The analytics server 102 may also end or reject the call, store the metadata for the call into one or more databases 104, 106, 108, or forward the call to a fraud analyst for various remedial measures.

An admin device 103 of the call analytics system 101 is a computing device allowing personnel of the analytics system 101 to perform various administrative tasks or user-executed call analytics operations. The admin device 103 may be any computing device comprising a processor and software, and capable of performing the various tasks and processes described herein. Non-limiting examples of an admin device 103 may include a server, personal computer, laptop computer, tablet computer, or the like. In operation, the admin device 103 is employed by a user to configure operations of various components in the system 100, such as an analytics server 102 or data appliance 120, and may further allow users to issue queries and instructions to various components of the system 100. For example, the admin device 103 may be used to label call data as being associated with fraudulent calls or non-fraudulent calls and store such labeled call data into a call record database 104 or analytics database 106.

The admin device 103 may also be used to input a threshold (e.g., threat risk threshold, verification threshold) to the analytics server 102 or an analytics database 106 for determining risk scores. In some cases, the threshold values may be global for all calling devices 114 to all customer call systems 110. In some cases, the admin device 103 may be used to tailor threshold values for a particular customer call system 110. The threshold values may also be tailored for certain purposes; for example, the admin device 103 may establish a stricter verification threshold requirement compared to a threat risk threshold. In addition, the analytics server 102 may determine risk scores as different parts of a call lifecycle, which may have increasing strictness. For example, the analytics server 102 executes a fraud risk assessment process using a risk threshold when an inbound call is received by a call center system 110 to initially determine the likelihood the call is not fraudulent. Later in the call, when the caller or calling device 114 attempts to access sensitive information (e.g., personal account information), the analytics server 102 executes call verification process using a comparatively stricter verification threshold.

A call records database 104 of the analytics system 101 may receive and store call data, as received by the call analytics system 101 from various sources, which may include customer call centers 110 and, in some cases, a telecommunications carrier or network device. The call records database 104 may be hosted on any computing device comprising one or more processors and software, and capable of performing the various processes and tasks described herein. As shown in FIG. 1, the call records database 104 may be hosted on a single computing device, but it should be appreciated that the call records database 104 may be hosted on any number of computing devices.

In operation, the call records database 104 may store call data (e.g., carrier metadata, derived metadata, call audio samples) for prior calls and current calls. The call records database 104 can be queried by an analytics server 102 or other devices of the system 100 when performing various tasks, such as generating or updating probability data, determining a risk score, or other operations requiring information about calling devices 114. Generally, when a caller places a telephone call to a customer call center 110, a caller device 114 instructs components of a telecommunication carrier system or network to originate and connect the current telephone call to the customer call center 110. A telecommunications carrier associated with the caller device 114, and in some cases the caller device 114 itself, generates various forms of call data (e.g., signaling data) an analytics server 102 uses when calculating fraud risk scores or generating probability lookup tables, trained machine-learning models, and/or feature vectors. The call data may be received by computing devices of the customer call center 110 and forwarded to the call analytics system 101, where such call data is stored into the call database 104.

As mentioned, the call data may comprise carrier metadata generated by computing devices of telecommunications systems and networks, such as switches and trunks. The call data may be stored into the call database 104 for later retrieval and analysis. In some implementations, an analytics server 102 may use the carrier metadata to generate the values of derived metadata when an incoming call is received and store such derived metadata into the call database 104 or other database (e.g., analytics database 106). And in some implementations, the analytics server 102 may generate derived metadata as part of the process for generating probability data, or as part of the process for generating a risk score.

An analytics database 106 may store various types of probability data generated by the analytics server 102 using call data for prior or current calls. The analytics database may be hosted on any computing device comprising one or more processors and software, and capable of performing various processes and tasks described herein. The analytics database 106 is in network communication with an analytics server 102 and may receive various forms of probability data generated or updated by the analytics server 102 via one or more networks of the call analytics system 101. As shown in FIG. 1, the analytics database 106 is hosted on a single computing device, but it should be appreciated that the analytics database 106 may be hosted on any number of computing devices. The probability data may comprise various data structures generated by the analytics server 102 using call data from various sources. The probability data may include, for example, probability lookup tables, feature vectors, and trained machine-learning models, among other forms of data structures and algorithms.

When determining a risk score for an incoming call is received at a call center system 110, the analytics server 102 may retrieve probability data according to certain metadata values received with the incoming call. The analytics server 102 then executes processes for determining the risk score for the call using the retrieved probability data.

The risk score operations executed by the analytics server 102 include several scoring components for that generate risk scores or matching-scores based upon the carrier signaling metadata received in header information. These scoring components includes appliance print scoring, carrier detection scoring, ANI location detection scoring, location similarity scoring, and JIP-ANI location similarity scoring, among others.

The ingestion functions executed by the analytics server 102, or input layers of a machine-learning architecture defining the feature extractor, perform functions for extracting various types of features or feature vectors (sometimes called "embeddings") representing metadata of the call data. The metadata includes, for example, observed carrier signaling metadata received in a SIP header or derived metadata determined by the analytics server 102 using the observed signaling metadata. The analytics server 102 applies the feature extractor on the call data to extract the features representing types of metadata. The feature extractor may further extract a feature vector for the call using the features extracted from the call data. In some cases, the analytics server 102 may store the call data or the features into a non-transitory storage medium of the analytics sever 102 or database 104, 112. Additionally or alternatively, the analytics server 102 receives certain metadata, such as a user account identifier, from an agent device 116, and stores the metadata from the provider system 110 into one or more databases 104, 114. In some implementations, the analytics server 102 obtains certain types of metadata from an external data source (e.g., third-party database 108).

The appliance-print scoring component references switch and trunk features extracted from the metadata. The appliance print component includes applying an unsupervised clustering algorithm described below, which assigns cluster numbers to switch and trunk values. Both the original values and the cluster numbers are compared against a previously received, prior call data, either passively using a previous call from the same ANI or Account or actively by receiving an "updating action" feedback from the call center system 110.

In some embodiments, a final switch-trunk-print authentication score is defined as a weighted sum of:

$$I(SW_i = SW_{i-1});$$

$$I(TRK_i = TRK_{i-1});$$

$$I(C(SW_i) = C(SW_{i-1}));$$

$$I(C(TRK_i) = C(TRK_{i-1})),$$

where:
I( ) is the indicator function, which takes 1 if the condition is true or 0 otherwise;
SWi and SWi−1 are the Switch values for the current call and the prior call respectively;
TRKi and TRKi−1 are the Trunk values for the current call and the prior call respectively;
C(TRK) indicates the mapping from Trunk value to Trunk cluster number; and
C(SW) indicates the mapping from Switch value to Switch cluster number.

In some circumstances, the analytics server 102 does not output a score if the SW and TRK were not seen in the training data. In some implementations, the analytics sever 102 computes the risk score as one minus an authentication score. In some implementations, the weighted sum is set to be the average by default and can be tuned to customer specific requirements, specified with either feedback or an authentication or risk score target distribution The Switch and Trunk are treated separately to generate clusters by the analytics server 102. The switch and truck may alternatively be treated as one pair. This would mean replacing the C(SW) and C(TRK) mapping to a C(SW-TRK) combined mapping in the score calculation.

To generate a cluster for, as an example, a switch (SW), the analytics server 102 uses pairs of calls incoming from same storing and updating paradigm (ANIs by default) and builds an adjacency matrix between the SW of the previous call and the SW of the current call. The server 102 applies and affinity propagation algorithm to the adjacency matrix to generate downstream lines and creates one or more lookup tables, which maps a switch value to a cluster number. For example, for the dataset illustrated in TABLE 1:

TABLE 1

| ANI | SW | TRK |
|---|---|---|
| 1111 | 1 | 2 |
| 1111 | 1 | 3 |
| 2222 | 1 | 4 |
| 2222 | 2 | 2 |
| 3333 | 2 | 1 |
| 3333 | 4 | 2 |
| 3333 | 3 | 4 |
| 3333 | 3 | 4 |

The adjacency matrix for the switch (SW), as shown in TABLE 2, will then be:

TABLE 2

| SW | 1 | 2 | 3 | 4 |
|---|---|---|---|---|
| 1 | 1 | 1 | 0 | 0 |
| 2 | 1 | 0 | 2 | 1 |
| 3 | 0 | 2 | 1 | 2 |
| 4 | 0 | 1 | 2 | 0 |

This matrix is then ready for Affinity Propagation and the results are stored with a lookup table representing the switch (SW) to switch cluster (SW cluster).

The analytics server 102 may execute a carrier detection scoring component, which utilizes, for example, Switch, Trunk, and OLI features. In some cases, the server 102 executes and applies a supervised multi-class machine learning model where the output represents the likelihood of each carrier present in the selected carriers for the given features.

The selected set of carriers is created from the training data and may be split into two steps: filtering out all carriers with very low call volume from the training data and training a preliminary model (note that this is not the final model) and, using the same training data, compute performance metrics (sometimes called "f1" values) for each carrier. The server 102 filter out carriers that have a lower f1 score than a certain threshold. This threshold is chosen empirically as well, typically using a value of 0.5.

The remaining carriers after the two steps are considered to be the selected carriers. At deployment phase, the analytics server 102 use the carrier likelihood corresponding to the ANI's carrier provider obtained from an external service (e.g., third-party database 108). If the carrier is not present in the selected carriers there is no prediction score. Otherwise, the output will be a score between 0 and 1 where the closer to 0 the stronger the carrier mismatch is and the closer to 1 the stronger the carrier match is. Additional examples are found in the method 300 of FIG. 3.

The server 102 and/or the machine-learning architecture includes various layers and functions performing for ANI location detection. This component utilizes Switch and Trunk features by combining them into a single Switch-Trunk pair feature. In some cases, the ANI location detection scoring component includes a supervised multi-class machine learning model where the output represents the likelihood of each location for the given features. During training, a lookup table is generated with the counts for each SW-TRK and location pair.

The lookup table would look like this example, as in TABLE 3:

TABLE 3

|  | CA | GA | FL |
|---|---|---|---|
| SWTRK1 | 20 | 30 | 50 |
| SWTRK2 | 90 | 0 | 10 |
| SWTRK3 | 35 | 35 | 10 |

During deployment, the server 102 uses the location likelihood corresponding to the ANI's location obtained from the third-party database 108. The output will be a score between 0 and 1 where the closer to 0 the stronger the location mismatch is and the closer to 1 the stronger the location match is.

Following the example of TABLE 3 above, and assuming a new incoming call with SWTRK1 and CA as the location obtained from the third-party database 108, the match or risk score will be one minus the output of the sigmoid function of 50 divided by 20, because 50 is the most likely area (FL) and 20 is the value for SWTRK1 and CA area: Sigmoid(50/20)=0.9241.

The server 102 and/or the machine-learning architecture includes various layers and functions performing for the location similarity scoring component. This component utilizes the previous ANI Location detection model to select the most likely location for prior calls in order to compare them with the current call, independent of the location obtained from the third-party service 107. The prior call score compared against the current call score can be computed as the likelihood ratio of the most likely location from the enrolled called:

$$P\left(\frac{\text{location}}{\text{current-call}}\right) / \left(\frac{\text{location}}{\text{enrolled-call}}\right)$$

For multiple prior calls, the result is the maximum likelihood of the current call against each prior calls. The server 102 applies a sigmoid with optional scaling and offset factor to map the score between 0 and 1. A score of 1 means an exact match of the likelihoods. The greater the score the stronger the location authentication score is. The lower the score (<1) the weaker the location authentication score is.

The server 102 and/or the machine-learning architecture includes various layers and functions performing for JIP-ANI location similarity scoring component. This component utilizes JIP and ANI features. JIP-ANI location similarity scoring component generates a lookup table for the JIP area code (first three digits of JIP number) and ANI area code (first three digits of the ANI excluding the country code). The ANI-JIP first three digits pairs are used to construct an adjacency matrix, which is symmetrical. The server 102 computes, for example, a Pearson correlation coefficient for each row (three-digit value) in the matrix and the resulting value represents the score. The output score is in a 0 to 1, where the closer to 0 the riskier the call is and represents the correlation between area codes in the training data set.

The machine-learning architecture includes various layers and functions performing for scoring outputs, such as an authentication score, risk score, fraud score, overall similarity score, or other types of scores. The scoring outputs may include various types of probability, similarity, or likelihood scores, and not limited to the examples described herein.

As shown in FIG. 1, a third-party telephony service system 107 comprises a telephony database 108 that stores information about, for example, calling devices 114, ANIs, and Caller IDs, among other information about telecommunications systems and devices. The call analytics system 101 may query the telephony database 108 according to purported information received from calling devices 114 during telephone calls, such as an ANI or Caller ID received with a current call. The information retrieved from the telephony database 108 may be, for example, various information known to be (by registration) or otherwise frequently associated with the Caller ID or ANI.

A telephony database 108 may receive and store call data for telephone calls. The data records of the telephony database 108 may include call data received from one or more sources, such as the call analytics system 101, a customer call center 110, and/or various telecommunications networks or carriers. The telephony database 108 may be hosted on any computing device comprising one or more processors and software, and capable of performing the various processes and tasks described herein. As shown in FIG. 1, the telephony database 108 may be hosted on a single computing device, but it should be appreciated that the telephony database 108 may be hosted on any number of computing devices. In addition, as shown in FIG. 1, the telephony database 108 is operated and managed by a third-party telephony service that receives certain call data from one or more telecommunications services, systems, and networks of the system 100. But in some embodiments, the telephony database 108 may be operated and managed by a particular telecommunications network or system; and in some embodiments, the telephony database 108 may be part of the call analytics system 101.

A third-party telephony service hosting the telephony database 108 is a company or other entity offering an administrative or overhead service of the nationwide or global telecommunications system. The third-party telephony service may provide a directory or telecommunications data management service that hosts telephony database 108 storing data of a variety types associated with any number of entities or people. The analytics service 101 may leverage the third-party telephony service as a "source of truth" or tool for validating or cross-referencing various metadata received with calls. The telephony database 108 may store data records mapping certain carrier metadata fields to certain derived metadata fields. For instance, the database records may store data indicating the translation of Caller ID or ANI (e.g., phone number) fields to, for example, a geographic location, an operating carrier, and a line type. When determining a risk score or updating probability data, the analytics server 102 may query the telephony database 108 according to, for example, a Caller ID or the ANI associated with prior calls or a current call.

In some implementations, the analytics system 101 may comprise an additional or alternative telephony database 108. For example, the analytics service 101 may host a telephony database 108, or other database (e.g., records database 104, analytics database 106), configured to store cached metadata associated with Caller IDs or ANIs that are frequently observed by the analytics service 101.

Caller devices 114 may be any communications or computing device that callers can operate to place a telephone call to a callee-destination (e.g., call centers 110) via one or more telecommunications networks. Non-limiting examples of caller devices 114 may include landline phones 114*a* or mobile phones 114*b*. It should be appreciated that caller devices 114 are not limited to telecommunications-oriented devices (e.g., telephones). As an example, a caller device 114 may include an electronic device comprising a processor and/or software, such as a computer 114*c* or IoT device, configured to implement voice-over-IP (VoIP) telecommunications. As another example, a caller device may include an electronic device comprising a processor and/or software, such as an IoT device (e.g., voice assistant device, "smart device"), capable of utilizing telecommunications features of a paired or otherwise internetworked caller device, such as mobile phone 114*b*. A caller device 114 may comprise hardware (e.g., microphone) and/or software (e.g., codec) for detecting and converting sound (e.g., caller's spoken utterance, ambient noise) into electrical audio signals. The caller device 114 then transmits the audio signal according to one or more telephony or other communications protocols to a callee for an established telephone call.

In operation, when a caller device 114 places a telephone call to a call center 110, the caller device 110 may request a telecommunications network or carrier to originate and connect a telephone call to the call center 110. The various components (e.g., switches, trunks, exchanges) of the telecommunications networks and carriers, and in some cases the caller device 114, may generate various forms of call data, which can be stored in a records database 104, and in some cases into a telephony database 108. When the telephone call is established between the caller device 114 and call center 110, a computing device of the call center 110, such as a customer server 111, call center agent device 116, or data appliance 120, forwards the call data to the analytics system 101 via one or more computing networks. The call data for the current, inbound telephone call may be received at device of the analytics system 101 (e.g., analytics server 102) and stored into an analytics database 106. The call data may comprise derived metadata that is based on data generated by or received from components of telecommunications networks and system. For example, the derived metadata may be fields whose values are calculated, queried, inferred, or otherwise determined using values received along with the carrier metadata, such as a Caller ID. The derived metadata fields may include, for example, a geographic location (e.g., Number Planning Area (NPA), state, city), a carrier associated with the telephone call and/or calling device 114, and a line type (e.g., landline, cellular, VoIP).

As mentioned, the call data of a telephone call that was originated from a caller device 114 may include media data (e.g., audio signal data) and signaling data. The signaling data may include, for example, call routing information, one or more identifiers (e.g., Caller ID, ANI) associated with the caller device 114, and information about the destination or callee (e.g., call center 110), among other types of information used to connect and manage the telephone call end-to-end. The identifiers associated with the caller device 114 (e.g., Caller ID, ANI) may be stored, managed, updated, and tracked in the records of a telephony database 108, which in some circumstances may be operated by a third-party service. The caller device 114, and in some cases a telecommunications carrier associated with the caller device 114 or telephone call, may append or update a data field of the signaling data containing the one or more identifiers. The analytics server 102 can use the various identifiers to query the telephony database 108 for additional data about, for example, the caller device 114 or telecommunications carrier. The telephony database 108 may store the call data for prior calls and current (or incoming) calls, which can be queried by an analytics server 102 or other devices of the system 100.

The customer call centers 110 comprise call center servers 111, customer databases 112, call center agent devices 116, and data appliances (not shown). Computing devices of call centers 110 may be configured to collect call data generated during phone calls between caller devices 114 and a call center 110 and forward the call data to the call analytics system 101 via one or more networks. Additionally or alternatively, call data collected at a call center 110 may be stored into a customer database 112 or customer server 111 and transmitted to the call analytics system 101 or perform various analytics processes. It should be appreciated that customer servers 111, customer databases 112, agent devices 116, and data appliances may each include or be hosted on any number of computing devices comprising a processor and software and capable of performing various processes described herein.

A customer server 111 of a customer call center system 110 may perform certain processes for capturing call data associated with calls made to the customer call center 110 and forwarding the call data to the analytics system 101 via one or more networks. In some cases, the customer server 111 may forward the call data according to preconfigured triggering conditions or in response to receiving an incoming phone call. In some cases, the customer server 111 may forward the call data to the analytics system 101 in response to instructions or queries received from another device of the system 100, such as an agent device 116, analytics server 102, or admin device 103. In some embodiments, the customer server 111 may host and execute software processes and services for managing a call queue and/or routing calls made to the call center system 110, which may include routing calls to an appropriate call center agent. The customer server 111 may provide information about the call, caller, and/or calling device 114 to an agent device 116 of the call center agent, where certain information may be displayed to the call center agent via a GUI of the agent device 116.

A data appliance of the call center system 110 may collect call data generated from phone calls between calling devices 114 and the call center 110. In some instances, call data collected at the call centers 110 is stored into a customer database 112 and/or transmitted to a customer server 111 and/or analytics server 102 to perform various analytics services.

An agent device 116 of the customer call center system 110 may allow agents or other users of the call center system 110 to configure operations of devices of the call center system 110. For calls made to the call center system 110, the agent device 116 may receive some or all of the call data associated with calls from a customer server 111 or customer database 112. The agent device 116 may likewise store call data into a customer database 112 and/or display to the agent via a GUI. In some implementations, the agent device 116 may be used to label call data as being associated with fraudulent calls or non-fraudulent calls and store such labeled call data into a customer database 112 or forward the labeled call data to the analytics system 101.

A customer database 112 of the customer call center system 110 may store call data received from a customer server 111, data appliance 120, or agent device 116. The customer database 112 may likewise transmit call data to the customer server 111, agent device 116, or analytics system 101 in response to instructions or queries, or pre-configured triggering conditions (e.g., receiving new call data, predetermined time interval).

Figure 2:
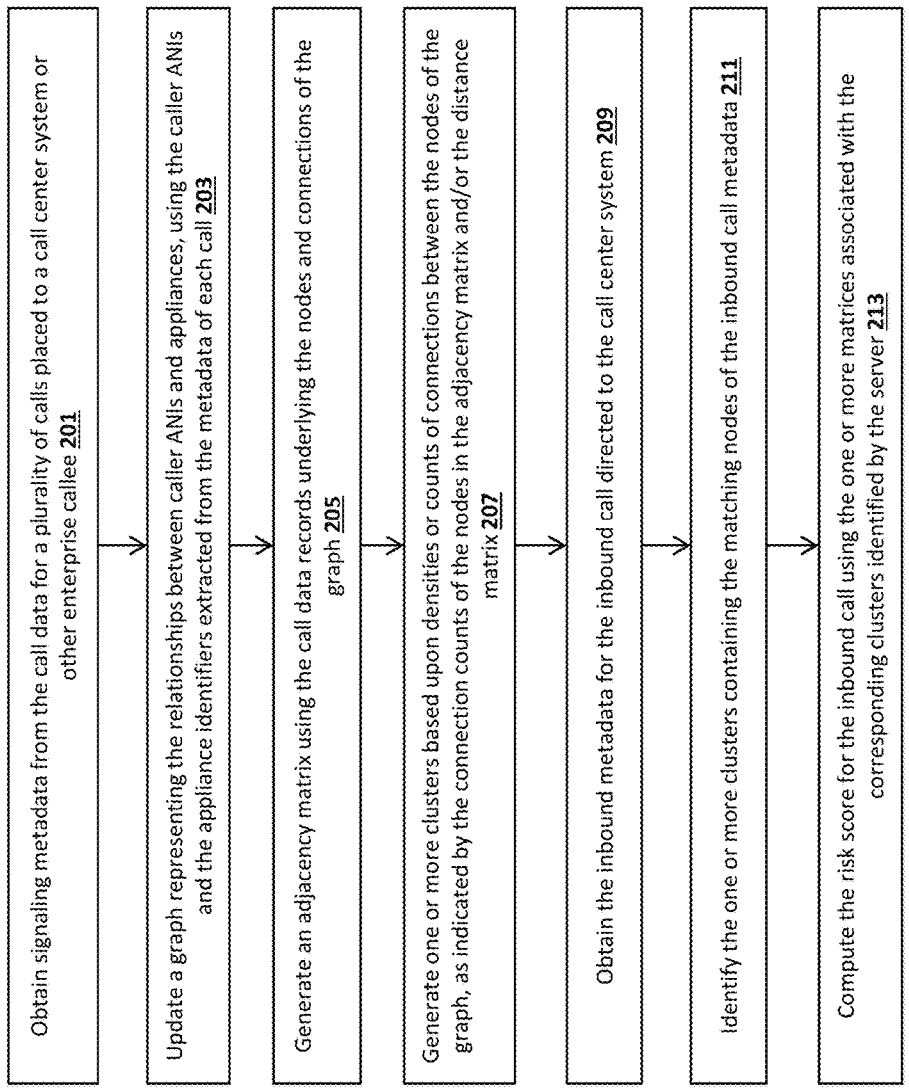
FIG. 2 shows steps of a method for training and deploying a machine-learning architecture for determining fraud risk using an appliance-print (or switch-trunk-print) scoring component, according to an embodiment.

FIG. 2 shows steps of a method 200 shows steps of a method for training and deploying a machine-learning architecture for determining fraud risk using an appliance-print (or switch-trunk-print) scoring component, according to an embodiment. The method 200 includes training and deploying a machine-learning architecture for fraud risk detection by extracting and analyzing feature vectors (sometimes referred to as embeddings, appliance-print, or trunk-switch-print) representing one or more telecommunications appliance devices (e.g., telecom switches, telecom trunks) of a telephony system involved with originating and establishing telephony-based calls, which a called device or system receives as an inbound call.

A server (e.g., analytics server 102) performs the steps of the method 200 by executing machine-readable software code that includes one or more machine-learning architectures, though embodiments may include any number of computing devices or any type of computing device that perform the various operations of the method 200. Embodiments may include additional, fewer, or different operations than those described in the method 200.

The server executes the machine-learning architecture comprising layers or functions defining an embedding extractor and one or more classifiers, among other potential sub-component engines, layers, or functions of the machine-learning architecture. In some embodiments, the machine-learning architecture constitutes multiple, distinct machine-learning architectures. In some embodiments, the machine-learning architecture includes a single machine-learning architecture. For ease of description, the machine-learning architecture of the method 200 constitutes the single machine-learning architecture. In some embodiments, the server actively or passively executes the software routines of the layers and functions of the machine-learning architecture in various operational phases, including a training phase, a deployment phase (sometimes referred to as the "testing phase" or "production phase"), and an optional enrollment phase. The server ingests and applies the machine-learning architecture on input call data of one or more calls, in accordance with the particular operational phase. The input call data refers to call data the includes certain types of metadata that the server ingests and applies the machine-learning architecture on, including training call data during the training phase, enrollment call data received during the enrollment phase, and inbound call data received during the deployment phase.

In operation 201, the server obtains signaling metadata from the call data for a plurality of calls placed to a call center system or other enterprise callee, where the signaling metadata includes, for example, the caller ANI, callee ANI, and appliance identifiers indicating particular telephony appliances, such as switch identifiers associated with telecom switches or trunk identifiers associated with telecom trunks. In some cases, the server receives the call data as forwarded from a computing device of the called enterprise system (e.g., call center server of a call center system). The metadata may include SIP header information extracted from SIP signaling protocols. For example, the server may receive or extract the metadata of a SIP INVITE message that indicates the caller ANI, callee ANI, switch, and trunk.

Optionally, the server performs certain functions that identify and filter away ANIs that are inconsistently, or not uniquely, associated with particular caller devices. These filtered ANIs include, for example, gateway ANIs associated with enterprise gateways or ANIs associated with certain applications. For instance, the server may filter gateway ANIs for an enterprise or generic Skype® phone numbers.

In operation 203, the server updates a graph representing the relationships between caller ANIs and appliances, using the caller ANIs and the appliance identifiers extracted from the metadata of each call. The server may include new nodes to the graph for a new instance of a new caller ANI or new appliance or may update existing nodes to include new connections or indicate an additional instance of an existing connection. In some implementations, the call database records include data fields indicating the logical formation of the graph. In some implementations, the server generates a visualization or image data representing the graph.

The server queries the graph to determine whether there are any instances of prior call data indicating the caller ANI, switch, or trunk. In the first instance of call data containing the caller ANI, the switch, or the trunk, the server generates a corresponding new graph node in the graph, representing the new caller ANI or new appliance.

The server updates the database records representing the graph to logically connect the graph node of the caller ANI with the graph nodes of the appliances, as observed by the server for the plurality of historic or current calls. The server continually updates the graph over time using the call metadata of the plurality of call data records associated with any number of historic and current calls, such that resulting connections between the caller ANI nodes and the appliance nodes of the graph represent the connections between the caller ANIs and the appliances, as observed over time from the metadata extracted from the call data.

In operation 205, the server generates an adjacency matrix using the call data records underlying the nodes and connections of the graph. The adjacency matrix is a data structure representing the graph, containing counts of the connections between the nodes. As an example, for a given appliance (e.g., switch, trunk), the adjacency matrix indicates the number of connections between the given appliance and other appliances or ANIs (e.g., caller ANIs, callee ANIs).

In some implementations, the server applies an affinity propagation operation that determines a number of second-level, downstream connections from the appliance or ANI, such that the outputs of the affinity propagation operation represent a relative distance or hops from the particular ANI or appliance. The server may generate a distance matrix based on the outputs of the affinity propagation or may update the adjacency matrix based upon the outputs of the affinity propagation. The affinity propagation outputs may produce the distance matrix that represents or defines the distances or hops between the graph nodes. The server may reference the one or more matrices and apply a clustering algorithm on the one or more matrices (as in later operation 205). The server may continually and iteratively update the one or more matrices at a given time interval, or in response to newly received call data or updated call data. The server may generate a copy of the adjacency matrix and update the count-values for the amount of connections between the nodes and/or generate a copy of the distance matrix and update the downstream connection counts.

In operation 207, the server generates the one or more clusters based upon densities (e.g., frequency, probability, volume) of connections between the nodes of the graph, as indicated by the connection counts of the nodes in the adjacency matrix and/or the distance matrix. As an example, the server generates an ANI cluster representing the amount of connections between a caller ANI and certain appliances or called ANIs. As another example, the server generates an appliance cluster representing the amount of connections between a particular appliance and ANIs or other appliances.

The server references the clusters to generate a risk score for an inbound call. The clusters indicate the likelihood or probability that the observed inbound signaling metadata (e.g., caller ANI, switch identifier, trunk identifier) of a current or recent inbound call should occur. At a later deployment phase, the server references the one or more clusters containing the nodes of the signaling metadata.

In some embodiments, the server generates mappings for the clusters. The server may assign a cluster identifier, such as a cluster number, to each of the clusters. After the server updates the matrices by counting each appliance node's connections and executing the affinity propagation operation for the appliance nodes, the server maps or otherwise associates the appliance and the appliance node to the particular cluster identifier for the cluster. The server may store the mappings in the call data records database or other analytics database. In such embodiments, during the later deployment phase, the server directly references the mappings stored in the database, rather than the one or more matrices, to identify the cluster and connections associated with inbound call metadata (e.g., inbound caller ANI, inbound appliance) for an inbound call currently received at the call center system.

In some cases, the server removes or otherwise sets aside the nodes having fewer connections, where the failing to satisfy a threshold number of connections or downstream connections. In this way, the server removes outlier nodes of a matrix that are not connected to any of the other nodes. Additionally or alternatively, in some cases, the server identifies the nodes having a number of connections failing to satisfy a clustering-threshold number of connections or downstream connections with other nodes. In this way, the server isolates and clusters the nodes of a matrix that are routinely connected with each other but not tightly connected other nodes, thereby identifying the cluster of nodes.

The server may continually update the clusters at a given interval or in response to a preconfigured triggering condition. For example, the server may update the clusters at a given time interval or when the server receives a new caller ANI or new appliance and generates the new caller ANI node or new appliance node in the database containing the call records for the graph.

In operation 209, the server obtains the inbound metadata for the inbound call directed to the call center system. The server receives the inbound metadata from the call center server and queries the analytics database for prior calls or the graph for node metadata (e.g., caller ANI node, appliance node) matching the inbound metadata (e.g., caller ANI, appliance indicator) for the inbound call.

If the server does not identify matching metadata, then the server generates the one or more corresponding new nodes in the graph (as in operation 203). The server updates the connections of the graph and the one or more matrices (as in operation 205).

In operation 211, after the server identifies the existing nodes of the graph matching the inbound metadata, the server identifies the one or more clusters containing the matching nodes of the inbound call metadata.

In operation 213, the server computes the risk score or authentication score for the inbound call using the one or more matrices associated with the corresponding clusters identified by the server. As mentioned, the server references the clusters to generate the risk score for the inbound call, where the clusters and related connection counts indicate the likelihood or probability that the observed inbound signaling metadata (e.g., caller ANI, switch identifier, trunk identifier) should be observed.

The server authenticates the inbound call when the risk score satisfies a threshold risk score, threshold authentication score, or the like. In some cases, the server applies a normalization function on the connection counts and/or on the probability values to generate a normalized risk score for the inbound call.

Figure 3:
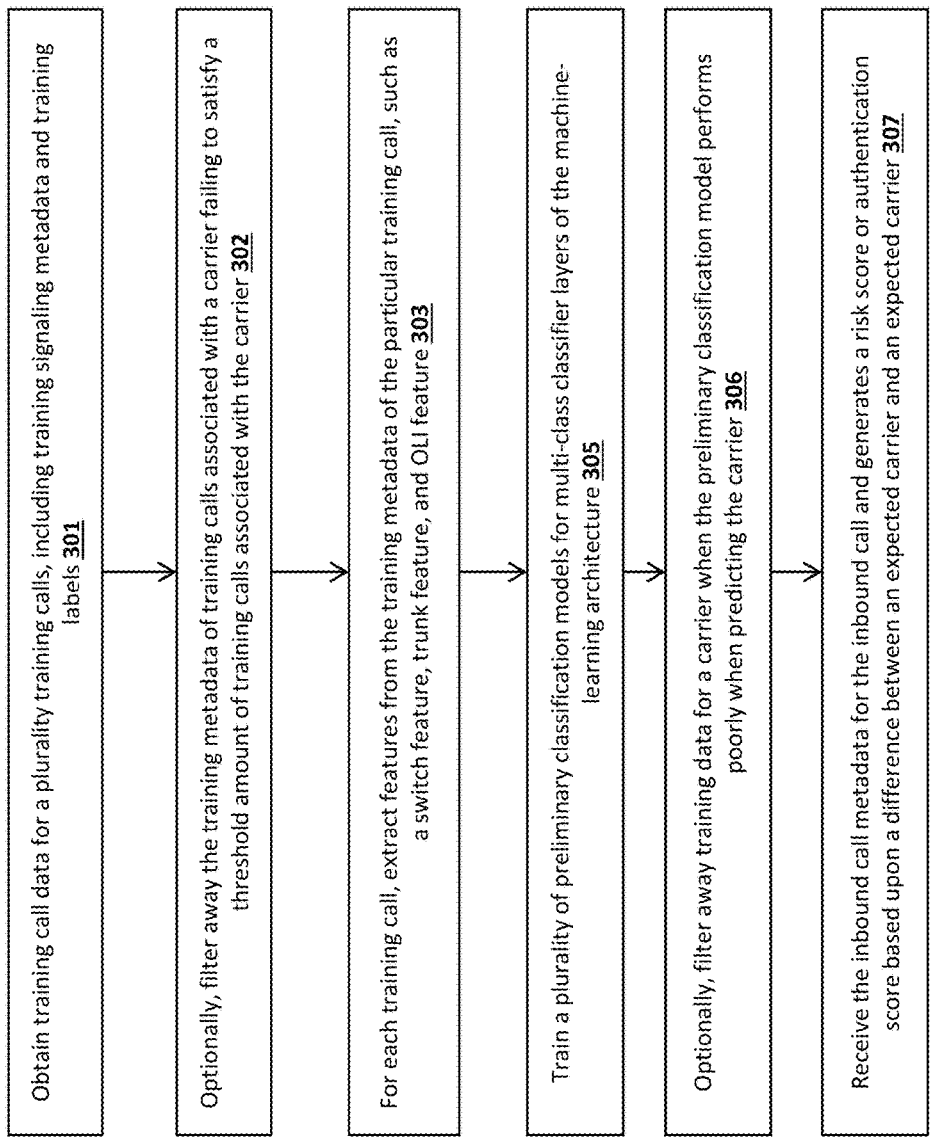
FIG. 3 shows steps of a method for performing fraud risk detection by executing a machine-learning architecture or other software programming for predicting carriers associated with telephony-based calls using signaling metadata, according to an embodiment.

FIG. 3 shows steps of a method 300 for performing fraud risk detection by executing a machine-learning architecture or other software programming for predicting carriers associated with telephony-based calls using signaling metadata, according to an embodiment.

A server (e.g., analytics server 102) performs the steps of the method 300 by executing machine-readable software code that includes one or more machine-learning architectures, though embodiments may include any number of computing devices or any type of computing device that perform the various operations of the method 300. Embodiments may include additional, fewer, or different operations than those described in the method 300.

The server executes the machine-learning architecture comprising layers or functions defining an embedding extractor and one or more classifiers, among other potential sub-component engines, layers, or functions of the machine-learning architecture. In some embodiments, the machine-learning architecture constitutes multiple, distinct machine-learning architectures. In some embodiments, the machine-learning architecture includes a single machine-learning architecture. For ease of description, the machine-learning architecture of the method 300 constitutes the single machine-learning architecture. In some embodiments, the server actively or passively executes the software routines of the layers and functions of the machine-learning architecture in various operational phases, including a training phase, a deployment phase (sometimes referred to as the "testing phase" or "production phase"), and an optional enrollment phase. The server ingests and applies the machine-learning architecture on input call data of one or more calls, in accordance with the particular operational phase. The input call data refers to call data the includes certain types of metadata that the server ingests and applies the machine-learning architecture on, including training call data during the training phase, enrollment call data received during the enrollment phase, and inbound call data received during the deployment phase.

In operation 301, the server obtains training call data for a plurality training calls, including training signaling metadata and training labels. The signaling metadata includes, for example, a caller ANI, callee ANI, appliance identifiers (e.g., switch identifier, trunk identifier), and OLI value, among others.

Optionally, in operation 302, the server filters away the training metadata of training calls associated with a carrier failing to satisfy a threshold amount of training calls associated with the carrier. Typically, training calls will include training metadata originating from a large amount of carriers and, for many carriers, hundreds or thousands (or even more) of the calls originate from the many carriers. In some circumstances, such as smaller or lesser-known carrier, a relatively small amount of the calls (e.g., 10 calls received from the carrier over a period of 3 months) originate from the smaller carrier. The server may identify and filter away the training metadata from the smaller carrier that originated an amount of training calls failing to satisfy the threshold amount of training samples or calls.

In operation 303, for each training call, the server extracts features from the training metadata of the particular training call, such as a switch feature, trunk feature, and OLI feature. The server extracts the training features from the training metadata by applying ingestion layers of a machine-learning architecture trained to extract the various types of features. For each training call, the server extracts a training feature vector as a mathematical representation of the features extracted from the training metadata of the particular training call.

In some cases, during a training phase, the server may train the ingest layers of the machine-learning architecture to extract the features and feature vectors of calls using the training labels. The training labels indicate the expected features or expected feature vector. The server may apply loss layers or other functions of the machine-learning architecture to identify a level of error between the expected features or expected feature vectors compared against the predicted features or predicted feature vectors extracted by the server and adjusts the hyperparameters of the ingestion layers of the machine-learning architecture based upon the level of error.

In operation 305, the server trains a plurality of preliminary classification models for multi-class classifier layers of the machine-learning architecture. Each preliminary model is associated with a particular carrier. For each of the training calls, the training labels indicate the expected carrier. For each of the carriers, the applies the corresponding preliminary classification model on the training feature vectors that outputs a preliminary carrier prediction, indicating the preliminary predicted carrier. The server may apply loss layers or other functions of the machine-learning architecture to identify binary accuracy output, based upon comparing the expected carrier indicated by the training label against the preliminary predicted carrier outputted by the server. The loss layers or other functions of machine-learning architecture adjust the hyperparameters or weights of the preliminary classification model, thereby tuning the accuracy of preliminary classification model trained for the given carrier.

At a later deployment time, the server applies each of the trained preliminary classification models as sub-components of the multi-class classifier. When executing the multi-class classifier layers for an inbound call, the machine-learning architecture applies each of the trained preliminary classification models on an inbound feature vector. Each trained classification model of the classifier outputs a probability value indicating a probability that corresponding carrier is associated with an inbound call. The classifier outputs a predicted carrier for the inbound carrier, where the predicted carrier is a carrier classification having, for example, the comparatively highest probability and/or has a probability that satisfies a carrier prediction threshold.

As an example, for three carriers, AT&T®, T-Mobile®, and Verizon®, the machine-learning architecture includes three classes. During the training phase, the machine-learning architecture trains three corresponding preliminary classification models. For instance, for AT&T®, the machine-learning architecture applies the preliminary classification model for the AT&T® carrier on the training feature vector extracted from the training metadata, and outputs a preliminary predicted carrier or binary output of whether the particular training call is from AT&T®. The machine-learning architecture tunes the preliminary classification model using the training labels indicating whether the training call is associated AT&T® or another carrier. The machine-learning architecture continues to tune each of the preliminary classification models until each satisfies an error threshold. Once trained, the machine-learning architecture joins the trained preliminary classification models for the carriers to form the operations for outputting the carrier probabilities of the multi-class classifier, such that each trained preliminary classification model outputs a carrier probability. The classifier may output the probabilities for each carrier and/or the carrier prediction.

Optionally, in operation 306, the server filters away training data for a carrier when the preliminary classification model performs poorly when predicting the carrier. The server generates one or more metrics for measuring the quality of the preliminary classification model, such as precision metric or recall metric. The server removes the training data for the carrier and removes or omits the preliminary classification model from the multi-class classifier when one or more performance metrics fail to satisfy a corresponding metric threshold. In some cases, the server combines the performance metrics (e.g., calculates a geometric average of the performance metrics) to output a combined performance metric. In such cases, the server removes the training data for the carrier and removes or omits the preliminary classification model from the classifier when the combined performance metric fails to satisfy the corresponding metric threshold.

In some embodiments, the server may further train multi-class classifier using the refined training call metadata. In such embodiments, the server again applies the preliminary classification models for the carriers on the refined training call metadata. The machine-learning architecture applies the loss layers on the predicted carrier outputs and tunes the parameters of each preliminary classification model using the expected carrier outputs indicated by the training labels of the training calls.

In operation 307, at the server receives the inbound call metadata for the inbound call and generates a risk score or authentication score based upon a difference between an expected carrier and an expected carrier.

To generate the predicted carrier, the server applies the classifier of the machine-learning architecture. The machine-learning architecture extracts the inbound features using the inbound call metadata and then extracts the inbound feature vector using the inbound features. The machine-learning architecture then applies the multi-class classifier comprising the trained carrier classification models on the inbound feature vector. The machine-learning architecture then outputs the predicted carrier as the carrier having a comparatively most-likely probability score and/or probability score satisfying a probability score threshold.

To generate the expected carrier, the server retrieves the carrier associated with the caller ANI from a third-party telecommunications information database. The server extracts the caller ANI from the inbound call metadata and queries the third-party database. The third-party database returns the carrier associated with the caller ANI, which the server receives and treats as the expected carrier.

The server generates the risk score based upon comparing the expected carrier against the predicted carrier. The server, for example, outputs a binary score of 0 or 1, or outputs the score between 0 and 1, where the closer to 0 the stronger the carrier mismatch is and the closer to 1 the stronger the carrier match is. In some cases, the server determines that the expected carrier is not present in the available carriers corresponding to the trained classifier models, or the server determines that the predicted carrier is not present in the available carriers listed in the third-party database. In such cases, the server does not output a carrier prediction score or risk score.

Figure 4:
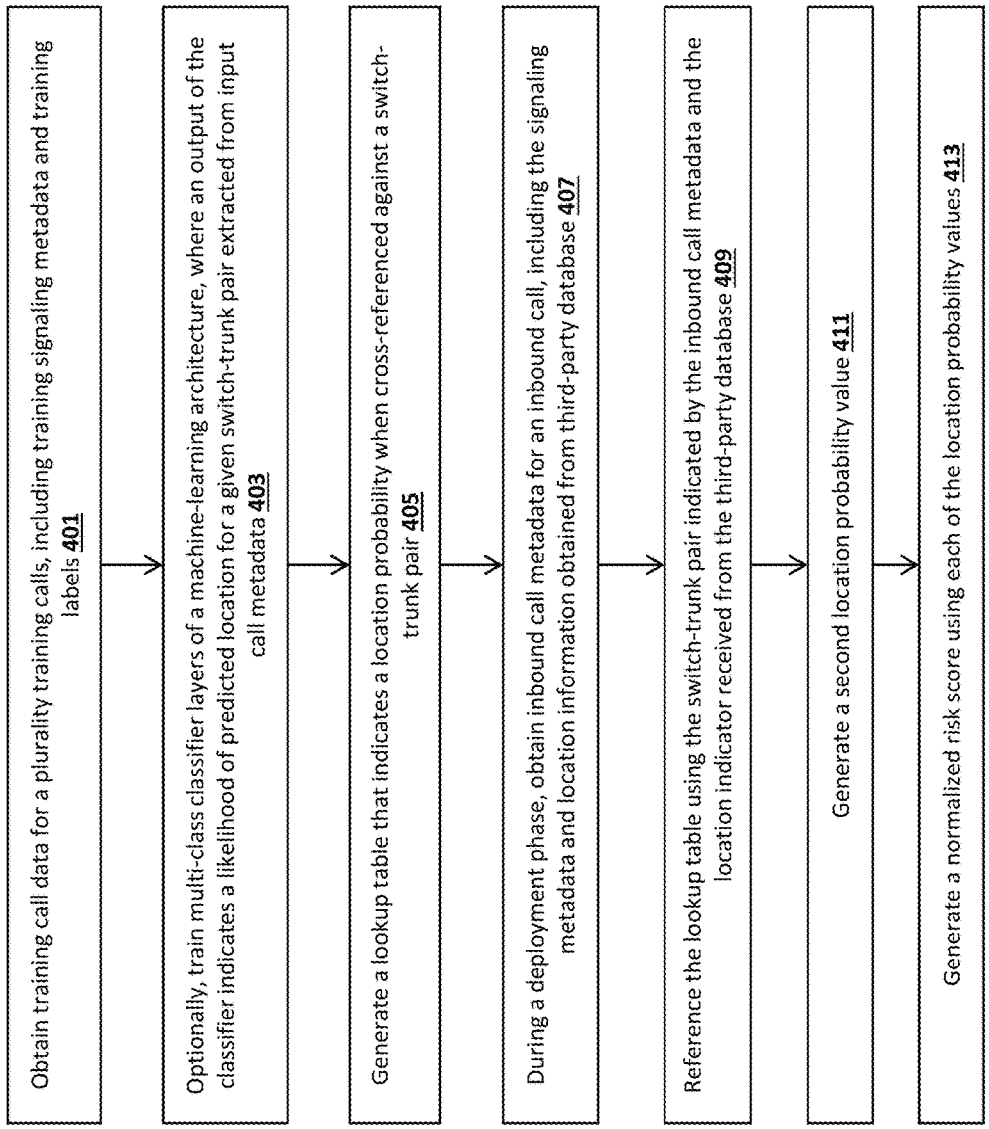
FIG. 4 shows steps of a method for performing fraud risk detection by executing a machine-learning architecture or other software programming for predicting locations associated with caller ANIs that originated telephony-based calls using signaling metadata, according to an embodiment.

FIG. 4 shows steps of a method 400 for performing fraud risk detection by executing a machine-learning architecture or other software programming for predicting locations associated with caller ANIs that originated telephony-based calls using signaling metadata, according to an embodiment.

A server (e.g., analytics server 102) performs the steps of the method 400 by executing machine-readable software code that includes one or more machine-learning architectures, though embodiments may include any number of computing devices or any type of computing device that perform the various operations of the method 400. Embodiments may include additional, fewer, or different operations than those described in the method 400.

The server executes the machine-learning architecture comprising layers or functions defining an embedding extractor and one or more classifiers, among other potential sub-component engines, layers, or functions of the machine-learning architecture. In some embodiments, the machine-learning architecture constitutes multiple, distinct machine-learning architectures. In some embodiments, the machine-learning architecture includes a single machine-learning architecture. For ease of description, the machine-learning architecture of the method 400 constitutes the single machine-learning architecture. In some embodiments, the server actively or passively executes the software routines of the layers and functions of the machine-learning architecture in various operational phases, including a training phase, a deployment phase (sometimes referred to as the "testing phase" or "production phase"), and an optional enrollment phase. The server ingests and applies the machine-learning architecture on input call data of one or more calls, in accordance with the particular operational phase. The input call data refers to call data the includes certain types of metadata that the server ingests and applies the machine-learning architecture on, including training call data during the training phase, enrollment call data received during the enrollment phase, and inbound call data received during the deployment phase.

In operation 401, the server obtains training call data for a plurality training calls, including training signaling metadata and training labels. The signaling metadata includes, for example, a caller ANI, callee ANI, and appliance identifiers (e.g., switch identifier, trunk identifier), among others. The server may obtain location information from one or more data sources, such as the training labels, historic call data records, or derived metadata determined by querying a third-party database using the training signaling metadata (e.g., caller ANI).

Optionally, in operation 403, the server trains multi-class classifier layers of a machine-learning architecture, where an output of the classifier indicates a likelihood of predicted location for a given switch-trunk pair extracted from input call metadata. During training, the machine-learning architecture extracts the switch-trunk pair for training metadata for the training call and applies the classifier on the switch-trunk pair to generate a predicted location. The machine-learning architecture then applies loss layers on the predicted location to generate a level or error by comparing the predicted location against an expected location for the training call, as indicated by the training label associated with the training call or by an administrative-user input. The loss layers or other function adjust the parameters of the multi-class classifier to improve the level of error until the level error satisfies a training threshold. The server may continually retrain the classifier at a preconfigured interval or in response to a triggering condition, such as receiving additional call data.

In operation 405, the server generates a lookup table that indicates a location probability when cross-referenced against a switch-trunk pair. The server generates a plurality of switch-trunk pairs from the training metadata. For each location indicated by the location information, the server determines a volume (or ratio) of the training calls that originated from the switch-trunk pairs and the particular location. The server may continually update the lookup table at a preconfigured interval or in response to a triggering condition, such as receiving additional call data.

In operation 407, during a deployment phase, the server obtains inbound call metadata for an inbound call, including the signaling metadata and location information obtained from third-party database. The signaling metadata includes, for example, a caller ANI, callee ANI, and appliance identifiers (e.g., switch identifier, trunk identifier), among others. The server may obtain the location information from third-party database by submitting a query for the location information associated with the caller ANI and receiving a location indicator.

In operation 409, the server references the lookup table using the switch-trunk pair indicated by the inbound call metadata and the location indicator received from the third-party database. The server then selects a first location probability value indicated by the lookup table entry at the intersection of the switch-trunk pair and the location indicator.

In operation 411, the server generates a second location probability value. In some embodiments, the server references the lookup table using the switch-trunk pair indicated by the inbound call metadata and selects second location probability value as the comparatively highest probability score for the same or different location indicated by the lookup table entry for the switch-trunk pair. Alternatively, in some embodiments, the server applies the trained multi-class classifier on the switch-trunk pair to generate the second location probability value.

In operation 413, the server generates a normalized risk score using each of the location probability values. The output will be a score between 0 and 1 where the closer to 0 the stronger the location mismatch is (suggesting higher risk or reduced likelihood of authentication) and the closer to 1 the stronger the location match is (suggesting lower risk or improved likelihood of authentication).

As an example, an inbound call includes metadata indicating a given switch-trunk pair and caller ANI. The server queries the third-party database using the caller ANI, and receives an indication that the caller ANI is associated with California. The server references the lookup table, which indicates a first probability score of 20 that the switch-trunk pair is associated with calls originating from California. The server further selects the highest probability score from the lookup table for the given switch-trunk pair, which indicates a second probability score of 50 that the switch-trunk pair is associated with calls originating from Florida. The server may generate risk score indicating an amount of distance or similarity strength between the first and the second location probability scores, which the server may normalize according to a normalization function. Continuing the same example, the machine-learning architecture generates the risk scores as 1 minus the output of the sigmoid function of 50 (the highest location probability) device by 20 (the reported location location): Sigmoid(50/20)=0.9241 and 1−0.9241=0.0759. The location match score (0.0759), which may be treated as a risk score or component of a risk score, is relatively close to zero, indicating a high-level of location mismatch (suggesting higher risk or reduced likelihood of authentication).

Figure 5:
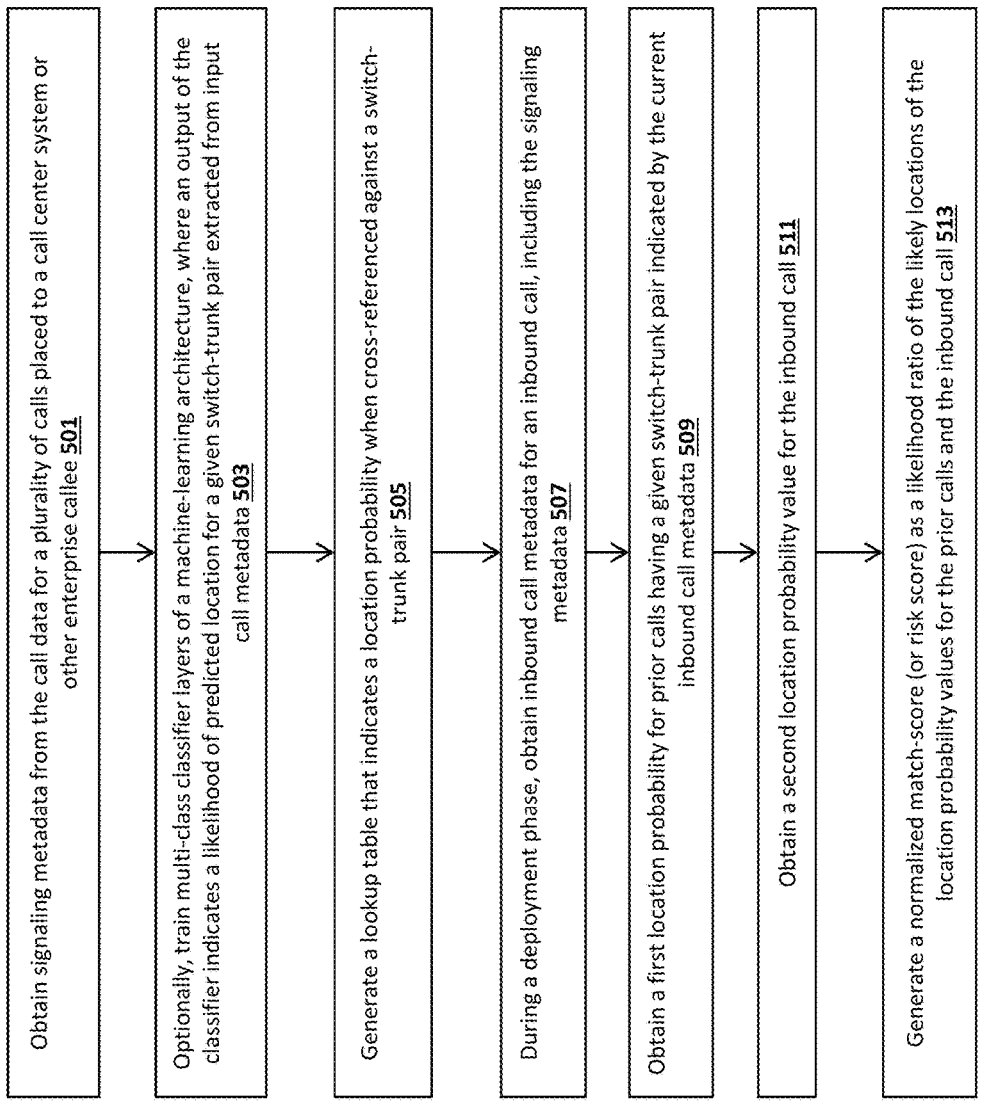
FIG. 5 shows steps of a method for performing fraud risk detection by executing a machine-learning architecture or other software programming for predicting locations associated with caller ANIs that originated telephony-based calls using signaling metadata, according to an embodiment.

FIG. 5 shows steps of a method 500 for performing fraud risk detection by executing a machine-learning architecture or other software programming for predicting locations associated with caller ANIs that originated telephony-based calls using signaling metadata, according to an embodiment. The method 500 includes evaluating prior predicted locations for prior telephony-based calls against a currently predicted location for a current inbound call.

A server (e.g., analytics server 102) performs the steps of the method 500 by executing machine-readable software code that includes one or more machine-learning architectures, though embodiments may include any number of computing devices or any type of computing device that perform the various operations of the method 500. Embodiments may include additional, fewer, or different operations than those described in the method 500.

The server executes the machine-learning architecture comprising layers or functions defining an embedding extractor and one or more classifiers, among other potential sub-component engines, layers, or functions of the machine-learning architecture. In some embodiments, the machine-learning architecture constitutes multiple, distinct machine-learning architectures. In some embodiments, the machine-learning architecture includes a single machine-learning architecture. For ease of description, the machine-learning architecture of the method 500 constitutes the single machine-learning architecture. In some embodiments, the server actively or passively executes the software routines of the layers and functions of the machine-learning architecture in various operational phases, including a training phase, a deployment phase (sometimes referred to as the "testing phase" or "production phase"), and an optional enrollment phase. The server ingests and applies the machine-learning architecture on input call data of one or more calls, in accordance with the particular operational phase. The input call data refers to call data the includes certain types of metadata that the server ingests and applies the machine-learning architecture on, including training call data during the training phase, enrollment call data received during the enrollment phase, and inbound call data received during the deployment phase.

In some implementations, the scoring component of the method 500 utilizes the previous ANI Location detection model (as discussed in the method 400 of FIG. 4) to select the most likely location for historic or training calls in order to compare them against a current inbound call, independent of location information obtained from a third-party telecommunications information data source service.

In operation 501, the server obtains training call data for a plurality training calls, including training signaling metadata and training labels. The signaling metadata includes, for example, a caller ANI, callee ANI, and appliance identifiers (e.g., switch identifier, trunk identifier), among others. The server may obtain or derive location information from, for example, the training labels or historic call data records indicating the location information.

Optionally, in operation 503, the server trains multi-class classifier layers of a machine-learning architecture, where an output of the classifier indicates a likelihood of predicted location for a given switch-trunk pair extracted from input call metadata. During training, the machine-learning architecture extracts the switch-trunk pair for training metadata for the training call and applies the classifier on the switch-trunk pair to generate a predicted location. The machine-learning architecture then applies loss layers on the predicted location to generate a level or error by comparing the predicted location against an expected location for the training call, as indicated by the training label associated with the training call or by an administrative-user input. The loss layers or other function adjust the parameters of the multi-class classifier to improve the level of error until the level error satisfies a training threshold. The server may continually retrain the classifier at a preconfigured interval or in response to a triggering condition, such as receiving additional call data.

In operation 505, the server generates a lookup table that indicates a location probability when cross-referenced against a switch-trunk pair. The server generates a plurality of switch-trunk pairs from the training metadata. For each location indicated by the location information, the server determines a volume (or ratio) of the training calls that originated from the switch-trunk pairs and the particular location. The server may continually update the lookup table at a preconfigured interval or in response to a triggering condition, such as receiving additional call data.

In operation 507, during a deployment phase, the server obtains inbound call metadata for an inbound call, including the signaling metadata. The signaling metadata includes, for example, a caller ANI, callee ANI, and appliance identifiers (e.g., switch identifier, trunk identifier), among others.

In operation 509, the server obtains a first location probability for prior calls having a given switch-trunk pair indicated by the current inbound call metadata. The server references the lookup table and selects the first location probability value as the comparatively highest location probability indicated by the lookup table entry at the intersection of the switch-trunk pair and the location indicator.

In operation 511, the server obtains a second location probability value for the inbound call. In some embodiments, the server references location information indicated by or derived from the inbound call metadata (e.g., determining a JIP or OLI as the location information derived from the caller ANI or switch-trunk pair). Alternatively, in some embodiments, the server applies the trained multi-class classifier on the switch-trunk pair of the inbound call metadata to generate the second location probability value.

In operation 513, the server generates a normalized match-score (or risk score) as a likelihood ratio of the likely locations of the location probability values for the prior calls and the inbound call. The server generates the likelihood ratio as the second probability value for the inbound call divided by the first probability value for the one or more prior calls. In some cases, for multiple prior calls, the resulting match-score is based upon a maximum likelihood of the current inbound call with respect to the probability value determined for the prior calls.

As computed by the server, a sigmoid with optional scaling and offset factor may be applied to map the resulting likelihood ratio as the match-score between 0 and 1, such that output will be the match-score between 0 and 1. In some implementations, a comparatively greater match-score indicates a stronger location match (suggesting lower risk or improved likelihood of authentication). A comparatively lower match-score indicates a weaker location match (suggesting higher risk or lower likelihood of authentication). In some cases, a lower match-score (e.g., less than 1) indicates a relatively weak location match score.

Figure 6:
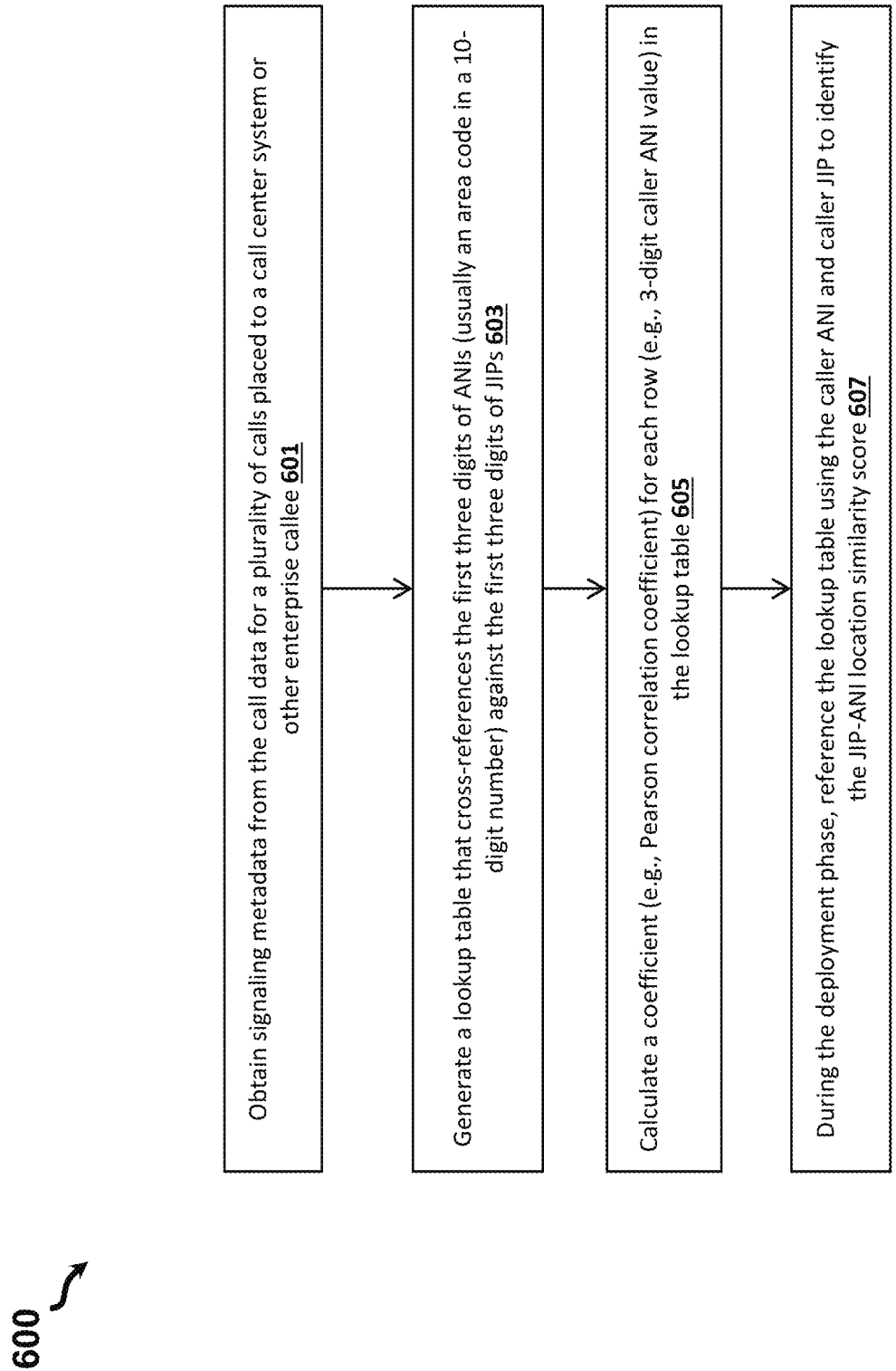
FIG. 6 shows steps of a method for performing fraud risk detection by executing a machine-learning architecture or other software programming for determining a probability or likelihood of an observed ANI-JIP pairing using precalculated expected probabilities of ANI-JIP pairings in the metadata associated with a telephony-based call, according to an embodiment.

FIG. 6 shows steps of a method 600 for performing fraud risk detection by executing a machine-learning architecture or other software programming for determining a probability or likelihood of an observed ANI-JIP pairing using precalculated expected probabilities of ANI-JIP pairings in the metadata associated with a telephony-based call, according to an embodiment. A server (e.g., analytics server 102) performs the steps of the method 600 by executing software components, including software module or engines and machine-readable software code that includes one or more machine-learning architectures, though embodiments may include any number of computing devices or any type of computing device that perform the various operations of the method 600. Embodiments may include additional, fewer, or different operations than those described in the method 600.

In operation 601, the server obtains signaling metadata from the call data for a plurality of calls placed to a call center system or other enterprise callee, where the signaling metadata includes, for example, the caller ANI, callee ANI, JIP, and appliance identifiers indicating particular telephony appliances, such as switch identifiers associated with telecom switches or trunk identifiers associated with telecom trunks. In some cases, the server receives the call data as forwarded from a computing device of the called enterprise system (e.g., call center server of a call center system). The metadata may include SIP header information extracted from SIP signaling protocols. For example, the server may receive or extract the metadata of a SIP INVITE message that indicates the caller ANI, callee ANI, switch, and trunk.

In operation 603, the server generates a lookup table that cross-references the first three digits of ANIs (usually an area code in a 10-digit number) against the first three digits of JIPs. For example, the rows of the lookup table include 202, 540, and 646, and the columns include the three-digit groupings of the JIPs in the prior call data. The entries indicate a density or adjacency containing a number of instances (or count) that the ANI-JIP pairs occurred in the caller ANI and caller JIP of the prior call metadata.

In operation 605, the server calculates a coefficient (e.g., Pearson correlation coefficient) for each row (e.g., 3-digit caller ANI value) in the lookup table. Generally, for example, an ANI calling from New York City will have the first three digits of 646 in the caller ANI and 646 in the caller JIP. As such, the correlations are expected to very high between caller ANIs and caller JIPs. The coefficient value indicates a JIP-ANI location similarity score. The output score is on a scale of 0 to 1, representing the similarity and correlation between area codes in the training call data set.

In operation 607, during the deployment phase, the server references the lookup table using the caller ANI and caller JIP to identify the JIP-ANI location similarity score. A comparatively lower score indicates a riskier inbound call and a comparatively high score indicates a less risky call.

Figure 7:
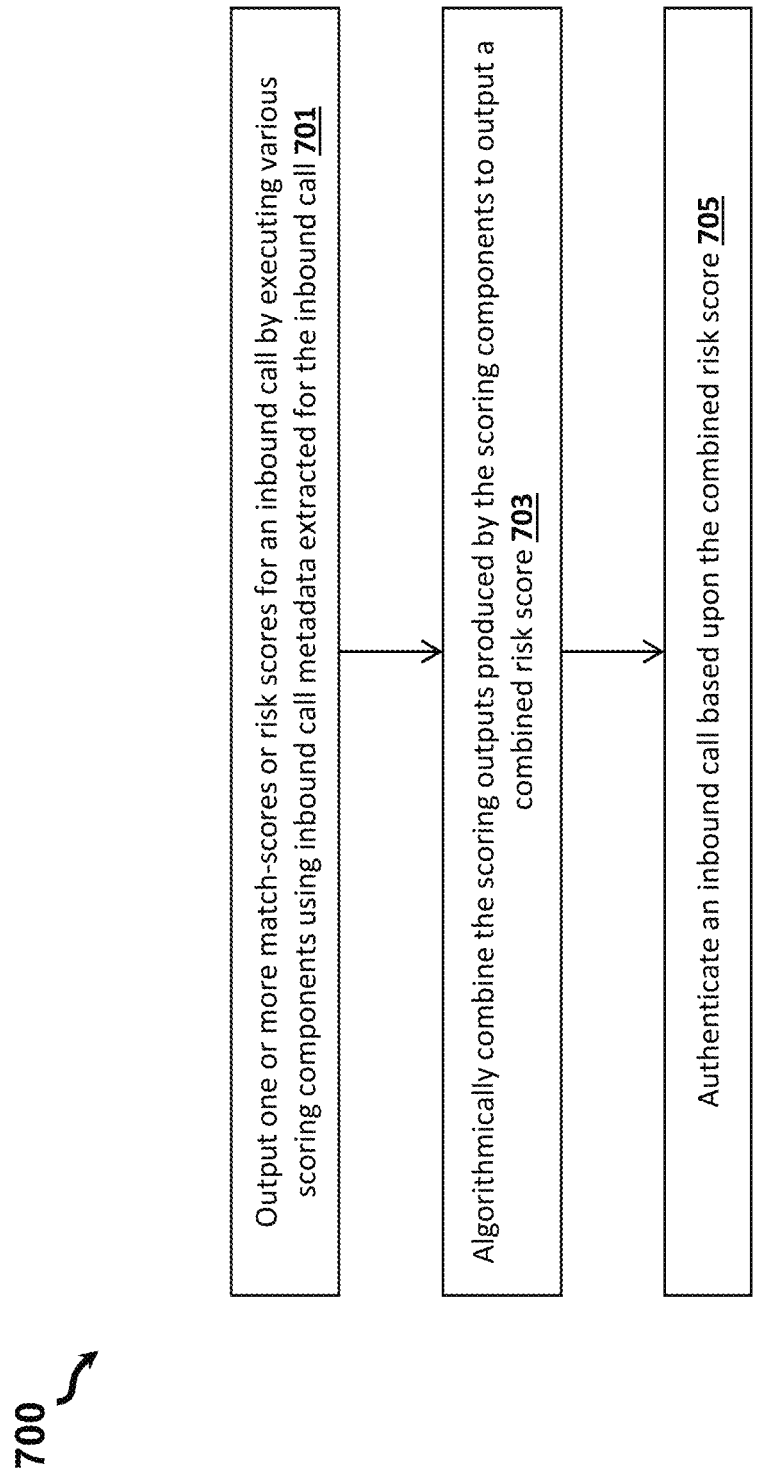
FIG. 7 shows steps of a method for performing fraud risk detection and authentication of a telephony-based inbound call by algorithmically combining scores outputted by various software components discussed herein for fraud risk detection using signaling metadata, according to various embodiments.

FIG. 7 shows steps of a method 700 for performing fraud risk detection and authentication of a telephony-based inbound call by algorithmically combining scores outputted by various software components discussed herein for fraud risk detection using signaling metadata, according to various embodiments. Details of such scoring components are discussed above an need not be detailed again for the discussion of the method 700. A server (e.g., analytics server 102) performs the steps of the method 700 by executing software components, including software module or engines and machine-readable software code that includes one or more machine-learning architectures, though embodiments may include any number of computing devices or any type of computing device that perform the various operations of the method 700. Embodiments may include additional, fewer, or different operations than those described in the method 700.

In operation 701, the server outputs one or more match-scores or risk scores for an inbound call by executing various scoring components described herein using inbound call metadata extracted for the inbound call. The scoring components generate, for example, a carrier detection probability score, an ANI-location probability score, an ANI-location similarity score, and/or a JIP-ANI location similarity score, among others. The outputs of the scoring components output scores between 0 and 1 or may be normalized to the scale of 0 to 1.

In some embodiments, a client computer (e.g., agent device of a call center system; administrative user computer of an analytics system) enters configuration inputs into the server to activate or deactivate various scoring components discussed herein.

In operation 703, the server algorithmically combines the scoring outputs produced by the scoring components to output a combined risk score. For example, in some implementations, the server averages each of the scores to generate the combined score. The server may receive configuration inputs from the client computer or agent computer indicating weighting values assigned to the outputs of certain scoring components, such that the combined score is a weighted combined score.

In operation 705, the server authenticates an inbound call based upon the combined risk score. For example, a combined score closer to 1 indicates a stronger match to prior or expected call data, suggesting the inbound call should be authenticated; and a combined score closer to 0 indicates mismatch to prior or expected call data, suggesting the inbound call should not be authenticated. In some cases, a combined risk score close to 0 suggests the call is high-risk or potentially fraudulent (e.g., spoofed metadata, imposter). The server may be configured to authenticate the inbound call if the combined score satisfies a threshold authentication score and/or deny authentication if the combined score satisfies a threshold fraud score.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   obtaining, by a computer, call metadata of a plurality of calls from directed to a call center system, the call metadata of each call indicates a caller ANI and a telephony appliance;
   generating, by the computer, one or more appliance clusters for one or more telephony appliances, each appliance cluster representing an amount of the plurality of calls including the telephony appliance and the caller ANI in the call metadata;
   generating, by the computer, a first risk score for an inbound call indicating a similarity of the telephony appliance in inbound metadata of the inbound call compared against the one or more telephony appliances represented by the one or more appliance clusters;

generating, by the computer, a predicted carrier score by applying a classifier comprising one or more machine-learning models of a machine-learning architecture on the inbound metadata of the inbound call, each machine-learning model is trained to output a carrier detection score for a particular carrier using a portion of the inbound metadata indicating the particular carrier;

generating, by the computer, a second risk score for the inbound call based upon comparing the predicted carrier score against an expected carrier score obtained from a database; and generating, by the computer, a combined risk score for the inbound call by algorithmically combining each risk score; and authenticating, by the computer, the inbound call in response to determining that the combined risk score satisfies at least one of a verification threshold or a combined fraud risk threshold.

2. The method according to claim 1, wherein the call metadata indicates a plurality of telephony appliances including a telephony switch and a telephony trunk.

3. The method according to claim 1, further comprising:
obtaining, by the computer, a location indicator for each call of the plurality of calls; and
generating, by the computer, a table containing a plurality of location probability values using the location indicator and the telephony appliance of each call of the plurality of calls.

4. The method according to claim 3, further comprising:
generating, by the computer, a first location probability score for the inbound call by querying the table according to the telephony appliance indicated by the inbound metadata for the inbound call;
obtaining, by the computer, a second location probability score for the inbound call by querying the database according to the caller ANI indicated by the inbound metadata for the inbound call; and
generating, by the computer, a third risk score for the inbound call based upon a similarity between the first location probability score and the second location probability score.

5. The method according to claim 1, further comprising:
generating, by the computer, a first location probability score for one or more calls of the plurality of calls by querying a table according to the telephony appliance indicated by the call metadata for the one or more calls;
generating, by the computer, a second location probability score for the inbound call by querying the table according to the telephony appliance indicated by the metadata for the inbound call, where the computer selects a comparatively highest probability value from the table; and
generating, by the computer, a fourth risk for the inbound call based upon a ratio between the first location probability score and the second location probability score.

6. The method according to claim 1, further comprising:
generating, by the computer, a first location probability score for one or more calls of the plurality of calls by querying a table according to the telephony appliance indicated by the call metadata for the one or more calls;
generating, by the computer, a second location probability score for the inbound call by applying a multi-classifier of the machine-learning architecture trained to output a location probability value using the telephony appliance indicated by the inbound metadata for the inbound call; and
generating, by the computer, a fourth risk for the inbound call based upon a ratio between the first location probability score and the second location probability score.

7. The method according to claim 1, further comprising:
obtaining, by the computer, one or more caller JIPs for each caller ANI of the plurality of calls; and
generating, by the computer, a table correlating a portion of caller ANIs against the portion of a caller JIP, the table indicating the amount of the plurality of calls having the call metadata containing the portion of the caller ANI and the portion of the caller JIP;
for each portion of the caller ANI in the table, computing, by the computer, a coefficient indicating a level of correlation between the portion of each caller ANI and the portion of the caller JIP; and
selecting, by the computer, a fourth risk score from the table according to the portion of the caller ANI and the portion of the caller JIP in the inbound metadata for the inbound call.

8. The method according to claim 1, wherein the computer generates a notification associated with the inbound call indicating whether the inbound call has been authenticated for display at a user interface of a client device.

9. The method according to claim 1, wherein the computer generates the combined risk score based upon applying one or more weighted values to one or more risk scores in accordance with a configuration input received from a client device.

10. The method according to claim 1, wherein the computer selectively generates a risk score in accordance with a configuration input received from a client device indicating an activation status for the risk score.

11. A system comprising:
a non-transitory storage configured to store a machine-learning architecture having a classifier layer comprising a plurality of machine-learning models executable by machine-executed software programming; and
a computer comprising a processor in communication with the non-transitory storage and configured to:
obtain call metadata of a plurality of calls from directed to a call center system, the call metadata of each call indicates a caller ANI and a telephony appliance;
generate one or more appliance clusters for one or more telephony appliances, each appliance cluster representing an amount of the plurality of calls including the telephony appliance and the caller ANI in the call metadata;
generate a first risk score for an inbound call indicating a similarity of the telephony appliance in inbound metadata of the inbound call compared against the one or more telephony appliances represented by the one or more appliance clusters;
generate a predicted carrier score by applying the classifier comprising one or more machine-learning models of the machine-learning architecture on the inbound metadata of the inbound call, each machine-learning model is trained to output a carrier detection score for a particular carrier using a portion of the inbound metadata indicating the particular carrier;
generate a second risk score for the inbound call based upon comparing the predicted carrier score against an expected carrier score obtained from a database; and generate a combined risk score for the inbound call by algorithmically combining each risk score; and authenticate the inbound call in response to determining that the combined risk score satisfies at least one of a verification threshold or a combined fraud risk threshold.

12. The system according to claim 11, wherein the call metadata indicates a plurality of telephony appliances including a telephony switch and a telephony trunk.

13. The system according to claim 11, wherein the computer further configured to:

obtain a location indicator for each call of the plurality of calls; and generate a table containing a plurality of location probability values using the location indicator and the telephony appliance of each call of the plurality of calls.

14. The system according to claim 13, wherein the computer further configured to:

generate a first location probability score for the inbound call by querying the table according to the telephony appliance indicated by the inbound metadata for the inbound call;

obtain a second location probability score for the inbound call by querying the database according to the caller ANI indicated by the inbound metadata for the inbound call; and generate a third risk score for the inbound call based upon a similarity between the first location probability score and the second location probability score.

15. The system according to claim 11, wherein the computer further configured to:

generate a first location probability score for one or more calls of the plurality of calls by querying a table according to the telephony appliance indicated by the call metadata for the one or more calls;

generate a second location probability score for the inbound call by querying the table according to the telephony appliance indicated by the inbound metadata for the inbound call, where the computer selects a comparatively highest probability value from the table; and generate a fourth risk for the inbound call based upon a ratio between the first location probability score and the second location probability score.

16. The system according to claim 11, wherein the computer further configured to:

generate a first location probability score for one or more calls of the plurality of calls by querying a table according to the telephony appliance indicated by the call metadata for the one or more calls;

generate a second location probability score for the inbound call by applying a multi-classifier of the machine-learning architecture trained to output a location probability value using the telephony appliance indicated by the inbound metadata for the inbound call; and generate a fourth risk for the inbound call based upon a ratio between the first location probability score and the second location probability score.

17. The system according to claim 11, wherein the computer further configured to:

obtain one or more caller JIPs for each caller ANI of the plurality of calls;

generate a table correlating a portion of caller ANIs against the portion of a caller JIP, the table indicating the amount of the plurality of calls having the call metadata containing the portion of the caller ANI and the portion of the caller JIP;

for each portion of the caller ANI in the table, compute a coefficient indicating a level of correlation between the portion of each caller ANI and the portion of the caller JIP; and select a fourth risk score from the table according to the portion of the caller ANI and the portion of the caller JIP in the inbound metadata for the inbound call.

18. The system according to claim 11, wherein the computer is configured to generate a notification associated with the inbound call indicating whether the inbound call has been authenticated for display at a user interface of a client device.

19. The system according to claim 11, wherein the computer is configured to generate the combined risk score based upon applying one or more weighted values to one or more risk scores in accordance with a configuration input received from a client device.

20. The system according to claim 11, wherein the computer is configured to selectively generate a risk score in accordance with a configuration input received from a client device indicating an activation status for the risk score.

* * * * *